(12) United States Patent
Ding

(10) Patent No.: US 11,187,561 B2
(45) Date of Patent: Nov. 30, 2021

(54) METHODS AND APPARATUS FOR PRESSURE BASED MASS FLOW RATIO CONTROL

(71) Applicant: MKS Instruments, Inc., Andover, MA (US)

(72) Inventor: Junhua Ding, Boxborough, MA (US)

(73) Assignee: MKS Instruments, Inc., Andover, MA (US)

( * ) Notice: Subject to any disclaimer, the term of this patent is extended or adjusted under 35 U.S.C. 154(b) by 145 days.

(21) Appl. No.: 16/800,363

(22) Filed: Feb. 25, 2020

(65) Prior Publication Data

US 2021/0263541 A1    Aug. 26, 2021

(51) Int. Cl.
*G01F 1/42* (2006.01)
*G05D 7/06* (2006.01)

(52) U.S. Cl.
CPC ............ *G01F 1/42* (2013.01); *G05D 7/0682* (2013.01)

(58) Field of Classification Search
CPC ..... G01F 1/34; G01F 1/36; G01F 1/40; G01F 1/42; G05D 7/0682
See application file for complete search history.

(56) References Cited

U.S. PATENT DOCUMENTS

| | | | | |
|---|---|---|---|---|
| 3,838,598 | A | * | 10/1974 | Tompkins ............... G01F 1/42 73/861.52 |
| 2014/0190579 | A1 | | 7/2014 | Ding |
| 2019/0204857 | A1 | | 7/2019 | Yasuda et al. |
| 2019/0339725 | A1 | | 11/2019 | Ding et al. |
| 2020/0033896 | A1 | | 1/2020 | Tseng et al. |

OTHER PUBLICATIONS

MKS Instruments, Inc. Data Sheet, "DLT2A2—Flow Ratio Controller Process Optimization Through Precise Flow Ratio Control," Flow Solutions, DELTA II DeviceNet, 2005, 4 pages.
MKS Instruments, Inc. Data Sheet, "DLT3B—3 Zone Flow Ratio Controller Enabling Process Optimization for Critical Deposition and Etch Processes," Flow Solutions, DELTA III EtherCAT, 2007, 4 pages.
MKS Instruments, Inc. Data Sheet, "DLTNA4—4 Zone Flow Ratio Controller Enabling Process Optimization for Critical Deposition and Etch Processes," Flow Solutions, DELTA IV DeviceNet, 2007, 4 pages.
International Search Report and Written Opinion, issued in PCT/US2021/017657, entitled "Methods and Apparatus for Pressure Based Mass Flow Ratio Control," 12 pages, dated May 3, 2021.
https://experience.brooksinstrument.com/pressure-based-mass-flow-controller-gp200; 2021.
https://www.brooksinstrument.com/en/about-us/news/2019/gp200-pressure-based-mfc-debuts, Data Sheet; 2021.

* cited by examiner

*Primary Examiner* — Benjamin R Schmitt
(74) *Attorney, Agent, or Firm* — Hamilton, Brook, Smith & Reynolds, P.C.

(57) ABSTRACT

A system and method for dividing a single mass flow into secondary flows of a desired ratio. The system and method include paths for the secondary flows that include a laminar flow element and two pressure sensors. The nonlinear relationship between flow and pressure upstream and downstream of the laminar flow elements can be transformed into a function comprised of the upstream and downstream pressure that has a linear relationship with the flow. This transformation allows for flow ratio control applications using signals from pressure sensors even if there is no information the fluid species and the flow rate into the flow ratio controller.

23 Claims, 8 Drawing Sheets

METHODS AND APPARATUS FOR PRESSURE BASED MASS FLOW RATIO CONTROL

BACKGROUND

The fabrication of semiconductor devices often requires the careful synchronization and precisely measured delivery of as many as a dozen gases to a processing tool, such as a vacuum chamber. Various recipes are used in the fabrication process, and many discrete processing steps, where a semiconductor device is cleaned, polished, oxidized, masked, etched, doped, metalized, etc., can be required. The steps used, their particular sequence, and the materials involved all contribute to the making of particular devices.

Accordingly, water fabrication facilities are commonly organized to include areas in which chemical vapor deposition, plasma deposition, plasma etchings, sputtering, and other similar gas manufacturing processes are carried out. The processing tools, e.g. chemical vapor deposition reactors, vacuum sputtering machines, plasma etchers, or plasma enhanced chemical vapor deposition, must be supplied with various process gases. Pure gases must be supplied to the tools in contaminate-free, precisely metered quantities.

In a typical water fabrication facility, the gases are stored in tanks, which are connected via piping or conduits to a gas box. The gas box delivers contaminant-free, precisely metered quantities of pure inert or reactant gases from the tanks of the fabrication facility to a process tool. The gas box, or gas metering system includes a plurality of gas paths having gas metering units, such as valves, pressure regulators and transducers, mass flow controllers, and filters/purifiers. Each gas path has its own inlet for connection to a separate source of gas, but all the gas paths converge into a single outlet for connection to the process tool.

Dividing the combined process gases among multiple process chambers or other destinations may be desired. In such cases, the single outlet of the gas box is connected to multiple locations through secondary flow paths or lines. Flow Ratio Controllers (FRCs) are used to measure and control the relative ratio of secondary flows in the secondary flow lines and ensure the precise delivery of fluids to the process chambers with secondary flows of known precise values.

Existing Flow Ratio Controllers use thermal flow sensors to measure and control the relative ratio of secondary flows due to the fact that thermal flow sensors have a linear response between thermal sensor signal and flow rate and low pressure drop characteristics. However, thermal flow sensors are prone to a zero drift which causes their accuracy to decrease over time. Additionally, the high temperatures found in thermal flow sensors can create undesired chemical reactions in certain gases that damage the thermal flow sensors and further reduce their accuracy.

SUMMARY

A need exists for a system and method that uses pressure based flow sensors to divide a single mass flow into secondary flows of desired ratios. Pressure based flow sensors may lack the issues found in thermal flow sensors but their relationship between pressure sensor signal and flow rate is highly nonlinear and thus requires knowledge of gas properties for use in flow ratio control applications.

A system for dividing an inlet flow into secondary flows that has of an inlet channel configured to receive an inlet flow. The system also has secondary flow lines connected to the inlet. Each secondary flow line of the system includes a flow path configured to carry a secondary flow with a secondary flow rate, an upstream pressure sensor configured to provide an upstream pressure signal representative of an upstream pressure, a downstream pressure sensor configured to provide a downstream pressure signal representative of a downstream pressure, a pressure drop element in the flow path downstream from the upstream pressure sensor and upstream from the downstream pressure sensor configured to create a linear response between the secondary flow rate and a function of the upstream pressure and the downstream pressure, and a valve configured to control the secondary flow based upon a control signal. In some embodiments, the valve may be located in the flow path downstream from the secondary flow lines' downstream pressure sensor. In some embodiments, the system further includes a temperature sensor configured to measure the temperature of the inlet flow.

The system also includes a controller configured to calculate a ratio of secondary flow rates based upon the upstream pressure signals and the downstream pressure signals. The system's controller is further configured to obtain a desired ratio of secondary flow rates by sending control signals, based on the calculated ratio secondary flow rates and the desired ratio of secondary flow rates, to the valves.

The pressure drop element of the secondary flow lines may be a laminar flow element. The laminar flow element may be one of an annulus, bundled tubes, corrugated plates, or multiple-layer plates. The pressure drop element may also be a compressed laminar flow element. The pressure drop element of the secondary flow lines may also be a nozzle or orifice.

In some embodiments, a single pressure sensor may be used as the upstream pressure sensor for all secondary flow lines that have valves located in the flow path of the secondary flow lines downstream from the pressure sensors.

The function of the upstream pressure and the downstream pressure may be the following equation:

$$f(Pu,Pd)=Pu^2-Pd^2$$

where $f$(Pu, Pd) is the function, Pu is the upstream pressure and Pd is the downstream pressure. The secondary flow rates may be determined by the following:

$$Q=k*f(Pu,Pd)$$

where Q is the secondary flow rate and k is a function of dimensions of the pressure drop element, fluid properties, and fluid temperature. In some such embodiments, k=k($\in$, d, L, mw, r, µ, T) where E, d, and L are the dimensions of the pressure drop element mw, r, and µ are the fluid properties, and T is the fluid temperature.

The secondary flow rates may be determined based on a 3D map composed of calibration points having variables Pu, Pd, and Q where Q is the secondary flow rate, Pu is the upstream pressure and Pd is the downstream pressure.

A method for dividing an inlet flow into secondary flows of desired ratios that is comprised of receiving an inlet flow at an inlet and dividing the inlet flow into secondary flow lines connected to the inlet. Each secondary flow lines utilized by the method includes a flow path configured to carry a secondary flow with a secondary flow rate, an upstream pressure sensor configured to provide an upstream pressure signal representative of an upstream pressure, a downstream pressure sensor configured to provide a downstream pressure signal representative of a downstream pressure, a pressure drop element in the flow path downstream from the upstream pressure sensor and upstream from the downstream pressure sensor configured to create a linear response between the secondary flow rate and a function of the upstream pressure and the downstream pressure, and a valve configured to control the secondary flow based upon a control signal. The method for flow ratio control further comprises determining by a controller, a ratio of secondary flow rates based upon the upstream pressure signals and the downstream pressure signals and obtaining a desired ratio of secondary flow rates by sending, by the controller, control signals, based on the calculated ratio secondary flow rates and the desired ratio of secondary flow rates, to the valves.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows. One particular use of the devices, systems, and methods disclosed is for use with gas metering systems for delivering contaminant-free, precisely metered quantiles of process and purge gases to semiconductor processing tools, chambers, and/or other systems, apparatus and devices. The presently disclosed devices, systems, and methods provide the benefit of operating without disturbing the performance of any upstream mass flow controllers. The presently disclosed devices, systems, and methods provide the benefit of allowing for a single mass flow to be divided into secondary flows of desired ratios using pressure sensors. The devices, systems, and methods provide the benefit of dividing a single flow of gas or liquid into multiple secondary flows of known, precise relative values of desired ratios without requiring either a relatively high upstream pressure or knowledge of gas or gasses that comprise the flows.

Figure 1:
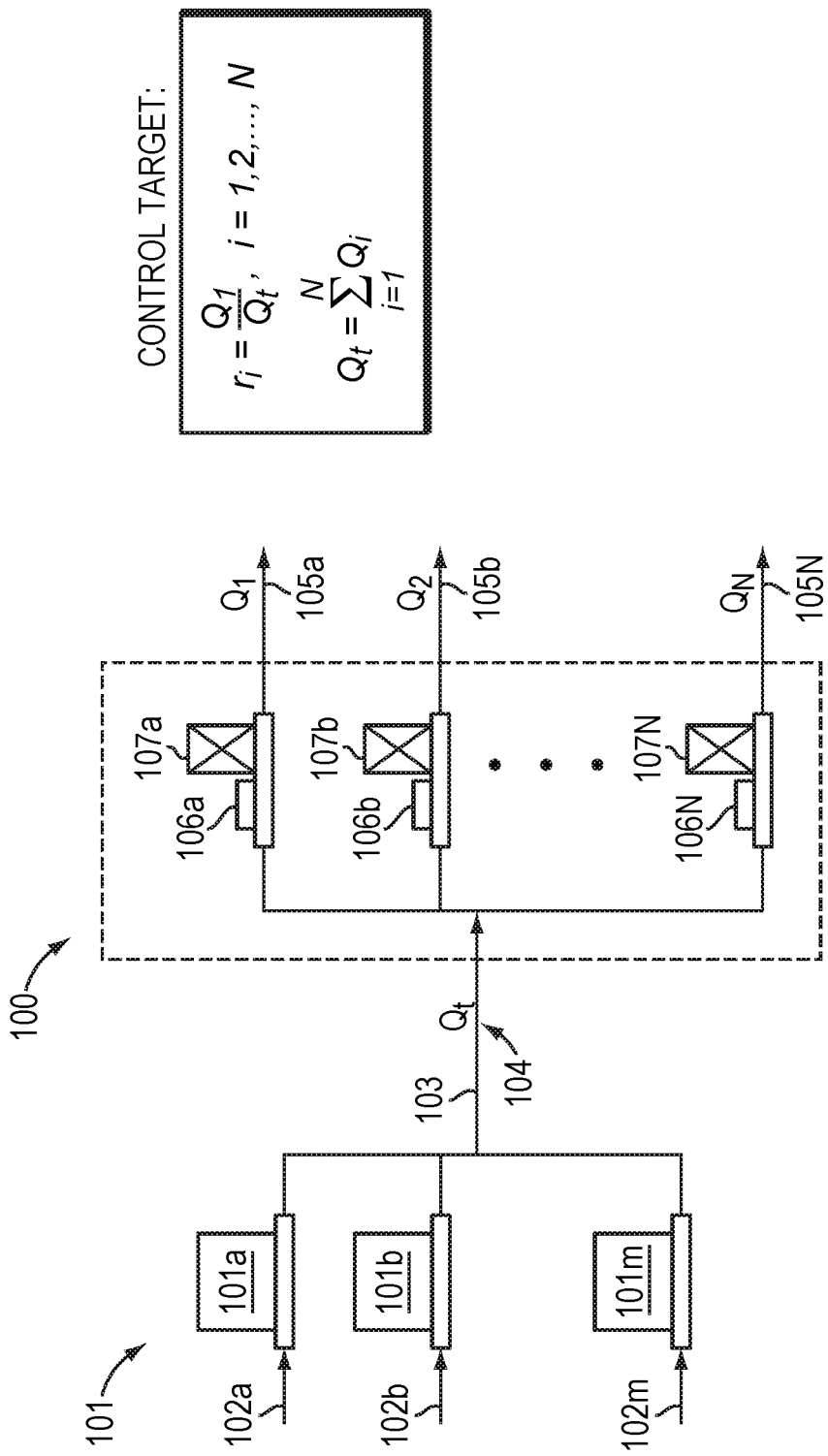
FIG. 1 is a schematic illustrating an existing flow ratio controller that receives a single mass flow from a set of mass flow controllers.

FIG. 1 is a schematic illustrating an existing flow ratio controller 100 that receives a single mass flow 103 from a set of mass flow controllers 101 shown for comparison. The set of mass flow controllers 101 control the flow of fluids 102 into an inlet line or manifold 104 of flow ratio controller 100. The fluids may be a mixture, including both process gases and a purge gas drawn from existing gas storage devices such as gas tanks. Although not shown, fluids 102 may be monitored or controlled by additional components such as filters, purifiers, and pressure transducers and controllers. The mass flow 102 forms an inlet flow 103 that is received by inlet 104. In other embodiments, the inlet flow is comprised of a single fluid 102 received from a single mass flow controller, a gas storage container, or other source. The inlet flow travels in inlet 104 at flow rate $Q_t$. The amount of gases 102 and mass flow controllers 101 can be variable. Gases 102 may originate from any potential source or gas storage device. Even if the properties of the individual gases 102 are known, the properties of mixture 103 and inlet flow rate $Q_t$ may be unknown due to different processing recipes.

The inlet 104 is connected to secondary flow lines 105a, 105b, . . . , 105N. The inlet flow is divided into secondary flows. The secondary flows travel within flow paths of the secondary flow lines 105 at secondary flow rates $Q_1$, $Q_2$, . . . $Q_N$. The flow ratio controller may have any number secondary flow lines and secondary flows depending upon the needs of the system it operates within. The sum of the secondary flow rates $Q_1$, $Q_2$, . . . , $Q_N$ within the secondary flow lines 105 must be equal to inlet flow rate Q as expressed in the equation:

$$\Sigma_{i=1}^{N} Q_i = Qt.$$

The ratio between the secondary flow rates $Q_1$, $Q_2$, . . . , $Q_N$ and the inlet flow rate $Q_t$ can be defined as the equation:

$$r_i = \frac{Q_i}{Q_t}$$

wherein $r_i$ is the flow ratio of secondary flow line i. Once the ratios between secondary flow rates $Q_1$, $Q_2$, . . . , $Q_N$ and the inlet flow rate $Q_t$ can be determined, they can be accurately controlled. The ratio of secondary flows is determined based on signals provided by flow sensors 106 on each secondary flow line 105 that provide signals indicative of the measured secondary flows.

The secondary flows can be controlled by valves 107 located on each secondary flow line 105. A controller is programed to receive the signals provided by flow sensors 106, determine the current ratio of secondary flows and send a control signal to at least one of the valves 107 causing them to alter the secondary flows in secondary flow lines 105 to obtain a desired ratio of secondary flows. The controller may be programed to receive a desired ratio of secondary flow rates, i.e. mass flow ratio setpoints ($r_{spi}$, i=1, 2 . . . N), from a host controller or through a user interface.

The controller is programmed to receive the signals indicative of measured secondary flows provided by flow sensors 106 and calculate the flow ratio of the secondary flows in the secondary flow lines. The controller is also programmed to calculate control signals based on the difference between the calculated ratios of secondary flows and the desired ratio of secondary flows using a feedback control algorithm such as PID or other feedback control algorithm.

The controller is also programmed to send the calculated control signals to at least one of the valves 107. The control signals instruct at least one the valves 107 to adjust at least one secondary flows. The controller, by sending a control signal to at least one of the valves 107, adjusts the secondary flow through at least one of the secondary flow lines 105 until the actual ratio of secondary flows equals the desired ratio of secondary flows.

If there is no prior knowledge about the fluid, or mixture of fluids, received by inlet 104 that comprise the inlet mass flow, to calculate the flow ratios, the relationship between the signal of flow sensors 106 and the secondary flows they monitor needs to be a linear. A linear function, f(x), has the following properties: $f(k*x)=k*f(x)$ and $f(x1+x2)=f(x1)+f(x2)$ where k is a constant. These properties are essential to the mathematical calculations used to isolate and calculate the secondary flow ratios without knowledge of the properties of fluid 103.

If $Q_1=f1(x1)$ where $Q_1$ is the flow rate of the secondary flows in secondary flow line 105a and $f1(x1)$ is a linear function of the signal x1 provided by flow sensor 106a and if $Q_2=f2(x2)$ where $Q_2$ is the flow rate of the secondary flows in secondary flow line 105b and $f2(x2)$ is a different linear function of the signal x2 of flow sensor 106b the ratio r between the two secondary flow rates $Q_1$ and $Q_2$ may be expressed as the follow equation:

$$r = \frac{Q_1}{Q_2} = \frac{f1(x1)}{f2(x2)}$$

Because of the linear properties of the functions $f1(x1)$ and $f2(x2)$, the above equation can be transformed as follows:

$$r = \frac{f1(x1)}{f2(x2)} = \frac{f1(y1*x0)}{f2(y2*x0)} = \frac{y1*f1(x0)}{y2*f2(x0)} = \frac{y1}{y2}*k0$$

where x0 is a constant therefore $$k0 = \frac{f1(x0)}{f2(x0)}$$

is a constant. y1=x1/x0 and y2=x2/x0 are transformed sensor signals. Functions $f1(x0)$ and $f2(x0)$ both include the same variables based upon fluid properties. Because function $f1(x0)$ is divided by function $f2(x0)$ to create k0, the variables based upon unknown fluid properties found in functions $f1(x0)$ and $f2(x0)$ cancel out and are no longer required to calculate the flow ratio, r. Therefore, the flow ratio $$\frac{Q_1}{Q_2}$$

is equivalent to the ratio of the transformed sensor signals $$\frac{y1}{y2}.$$

This relationship allows or me determination of the ratio of secondary flow rates based upon the signals provided by flow sensors 106. The ratio of secondary flow rates can be determined even if there is no prior information about the gas or fluid 103 within inlet 104 and/or inlet flow rate $Q_r$.

In flow ratio controllers, such as the one depicted in FIG. 1, the mathematical limitations of the transformation used to determine the ratio of secondary flow rates require the use of flow sensors 106 with a linear response between the signal of the flow sensors 106 and the flow they measure within the secondary flow lines 105. The thermal flow sensors typically used in flow ratio controllers have such a linear response.

Figure 2:
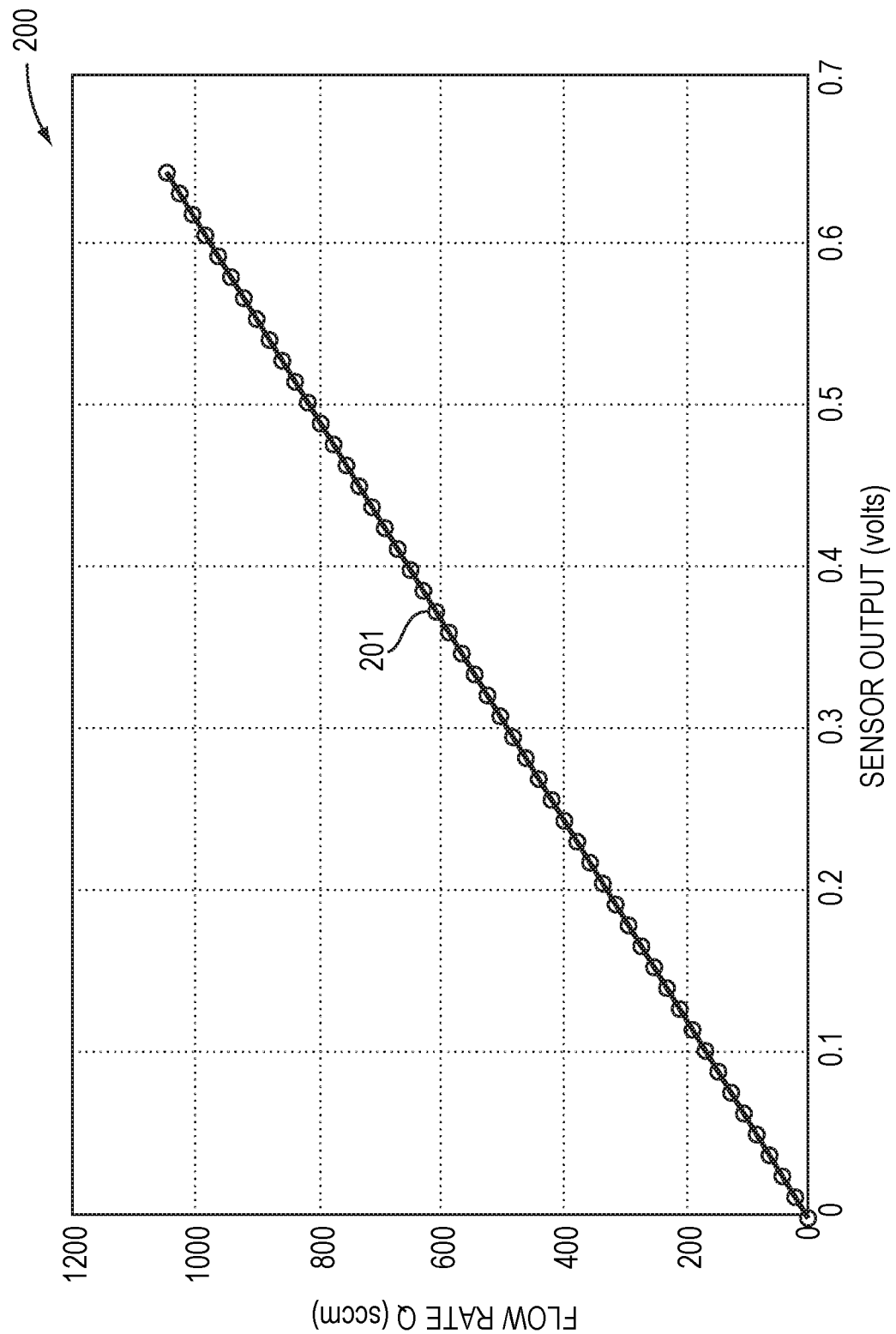
FIG. 2 is a graph of illustrating the relationship between the sensor output of a thermal flow sensor and the flow rate at the measurement location.

FIG. 2 is a graph 200 illustrating the relationship 201 between the sensor output of a thermal flow sensor and the flow rate at the measurement location. Thermal flow sensors have a sensor output that is related by linear function 201 to flow rate measured, as shown in graph 200. Additionally, thermal flow sensors have a low pressure drop which is benefit in certain situations requiring flow ratio control. However, there are drawbacks in using thermal flow sensors. Specifically, thermal flow sensors experience a long-term drift in their measurements that introduces inaccuracies into a flow ratio controller that uses thermal flow sensors. Also, the high temperatures of a thermal flow sensor can cause undesirable chemical reactions if used in combination with certain reactive gas species such as HBr and Cl2. This reaction may further decrease thermal sensor accuracy.

Pressure based mass flow measurement techniques and sensors provide an alternative to thermal based mass flow sensors. A flow ratio controller that uses pressure sensors may have better performance than existing thermal based flow ratio controllers in terms of zero drift, corrosive resistance, and high temperature capability. However, the pressure based mass flow measurements usually have a highly nonlinear relationship between the pressure sensor output and flow rate. This relationship can be extremely complex and include fluid properties as important variables. For example, the flow rate (Q) for a nozzle in un-choked flow conditions is determined by the following equation:

$$Q = C'*A*Pu*\left(\frac{R*T}{M}*\frac{2\gamma}{\gamma-1}\right)^{\frac{1}{2}}*\left(\frac{Pd}{Pu}\right)^{\frac{1}{\gamma}}*\left(1-\frac{Pd^{\frac{\gamma-1}{\gamma}}}{Pu}\right)^{\frac{1}{2}}$$

where C' is the discharge coefficients, A is the throat area of the nozzle, Pu is the pressure upstream of the nozzle, Pd is the pressure downstream of the nozzle, R is the universal gas constant, T is the fluid temperature, M is the fluid molecular weight, and γ is the ratio of specific heats of the gas. Because of this and other highly nonlinear relationship, fluid properties are required to directly determine flow ratios using measurements from pressure sensors. However, if a pressure drop element such as a laminar flow element, is placed channel carrying a flow, it creates a new relationship between the pressure upstream of the element, the pressure downstream of the element and the flow.

In mass flow ratio control applications, the gas properties of the inlet flow may not be known to the flow ratio controller. These properties include but limited to the gas specific heat, the gas molecular weight, and the gas viscosity which are necessary to determine the absolute secondary flow rate in each of secondary flow channels. The inlet mass flow may also be comprised of an unknown mixture of least two components.

The secondary flow rates may be determined in general by the following equation:

$$Q=f(\in,d,L,mw,r,\mu,T,Pu,Pd)$$

where Q is the secondary flow rate and $f(\ )$ is a function of dimensions of the pressure drop element ($\in$, d, L), fluid properties (mw, r, $\mu$), fluid temperature (T), the upstream pressure (Pu) and the downstream pressure (Pd). For laminar flow elements, the function $f(\ )$ can have the form of:

$$Q=f(\in,d,L,mw,r,\mu,T,Pu,Pd)=k(\in,d,L,mw,r,\mu,*(Pu^2-Pd^2)$$

where $k(\ )$ is a function without the pressures, i.e Pu & Pd. In other words, the effect of the upstream pressure and the downstream pressure on the flow rate Q can be separated from other factors.

Figure 3:
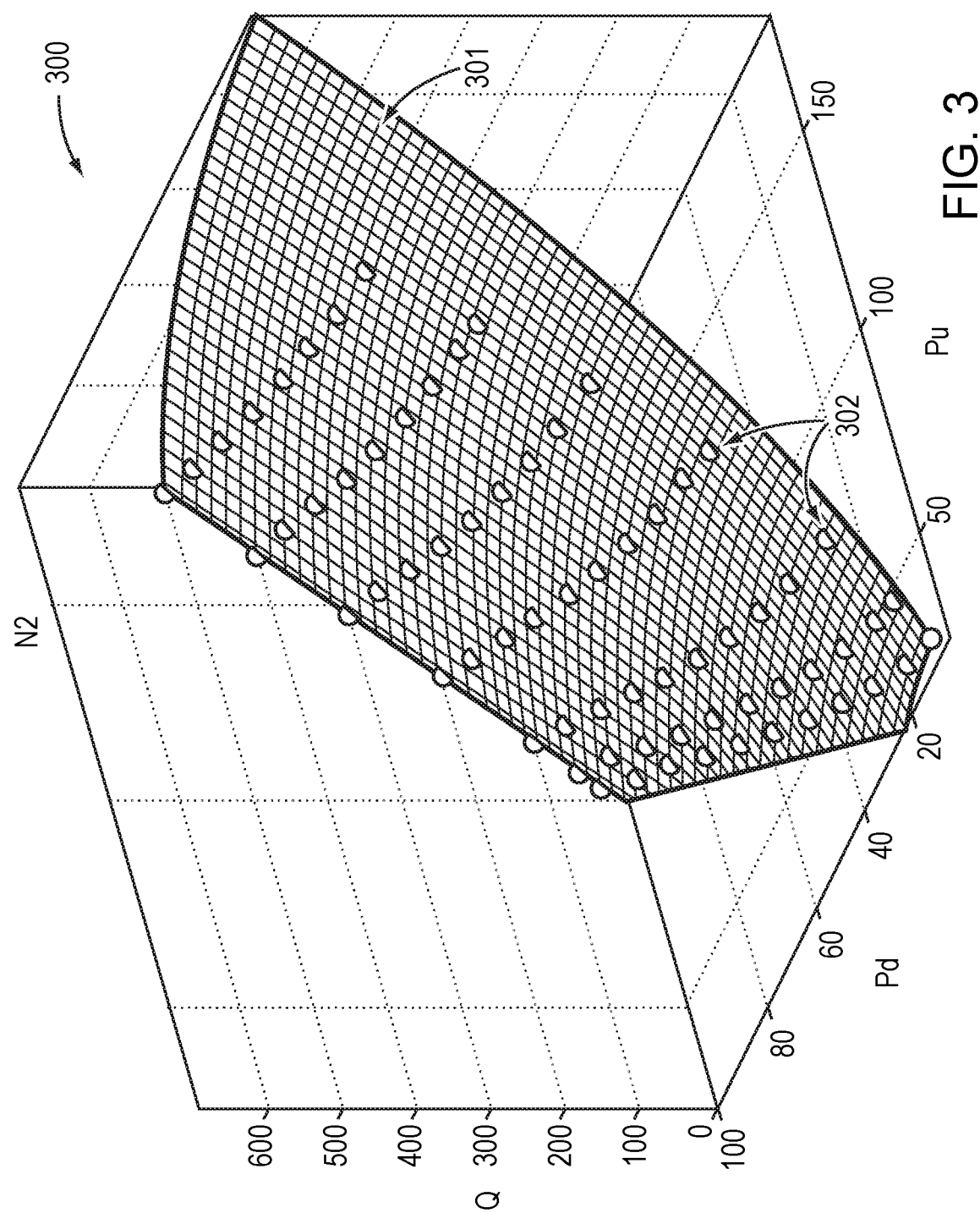
FIG. 3 is a three-dimensional graph illustrating the relationship between the upstream pressure, downstream pressure, and flow for the gas N2 in a channel with a laminar flow element.

FIG. 3 is a three-dimensional graph 300 illustrating the relationship 301 between the upstream pressure, downstream pressure, and flow for the gas N2 in a channel with a laminar flow element. Graph 300 displays the relationship 301 between the pressure upstream from the element Pu, the pressure downstream of the element Pd, and the flow rate within the channel Q and includes specific data points 302. The relationship 301 between Q, Pu, and Pd is still highly nonlinear:

$$Q=k(\in,d,L,mw,r,\mu,T)*(Pu^2-Pd^2)$$

where k($\in$, d, L, mw, r, $\mu$, T) is a function dependent upon the geometry of the laminar flow element ($\in$, d, L) fluid properties (mw, r, $\mu$) and gas temperature T. For the function k($\in$, d, L, mw, r, $\mu$, T), $\in$ is the porosity of the laminar flow element if it is porous media, d is the inner diameter of an annulus bypass or bundled tubes laminar flow element, and L is the length of the laminar flow element. However, all of the variables of $k(\ )$ can be kept constant across secondary flow lines of a flow ratio controller, therefore $k(\ )$ can be treated as a mathematical constant assuming the gas temperature is fixed. If $k(\ )$ is a constant, the flow rate in a channel that has a laminar flow element is linearly related to the difference between the square of the pressure upstream from the element and the square of the pressure downstream of the element. Using the following example vector transformation sequence, it is possible to derive a vector variable from the two pressures, Pu and Pd, that is linear related to flow, Q. The two vectors can be defined as follows:

(1) the modified pressure vector $\vec{X}$ $$\vec{X}=[x1,x2]'=[Pu^2,Pd^2]'$$

which is a column vector comprised of the upstream pressure and downstream pressure scalar variables where [ ]' is the vector transpose operator, and (2) the transformation vector $\vec{K}$ $$\vec{K}=[k(\in,d,L,mw,r,\mu,T),-k(\in,d,L,mw,r,\mu,T)]$$

which is a row vector of the scalar constant function k (E, d, L, mw, r, $\mu$, T). The relationship between Q, Pu and Pd can be rewritten using the using the above two vectors as $$Q=k(\in,d,L,mw,r,\mu,T)*(Pu^2-Pd^2)$$

$$Q=[k(E,d,L,mw,r,\mu,T),-k(\in,d,L,mw,r,\mu,T)]\cdot[Pu^2,Pd^2]'$$

$$Q=\vec{K}\cdot\vec{X}$$

where $\cdot$ is the dot product operator for a matrix/vector. The rewritten flow rate Q has a linear relationship with the modified pressure vector $\vec{X}$ which is derived from the upstream pressure Pu and the downstream pressure Pd for each of the secondary flow channels. In other words, using a laminar flow element as a pressure drop element in a pressure based flow ratio controller provides a linear response between the flow rate Q and the modified pressure vector variable $\vec{X}$. The allows for mass flow ratio control for an unknow inlet fluid.

Figure 4:
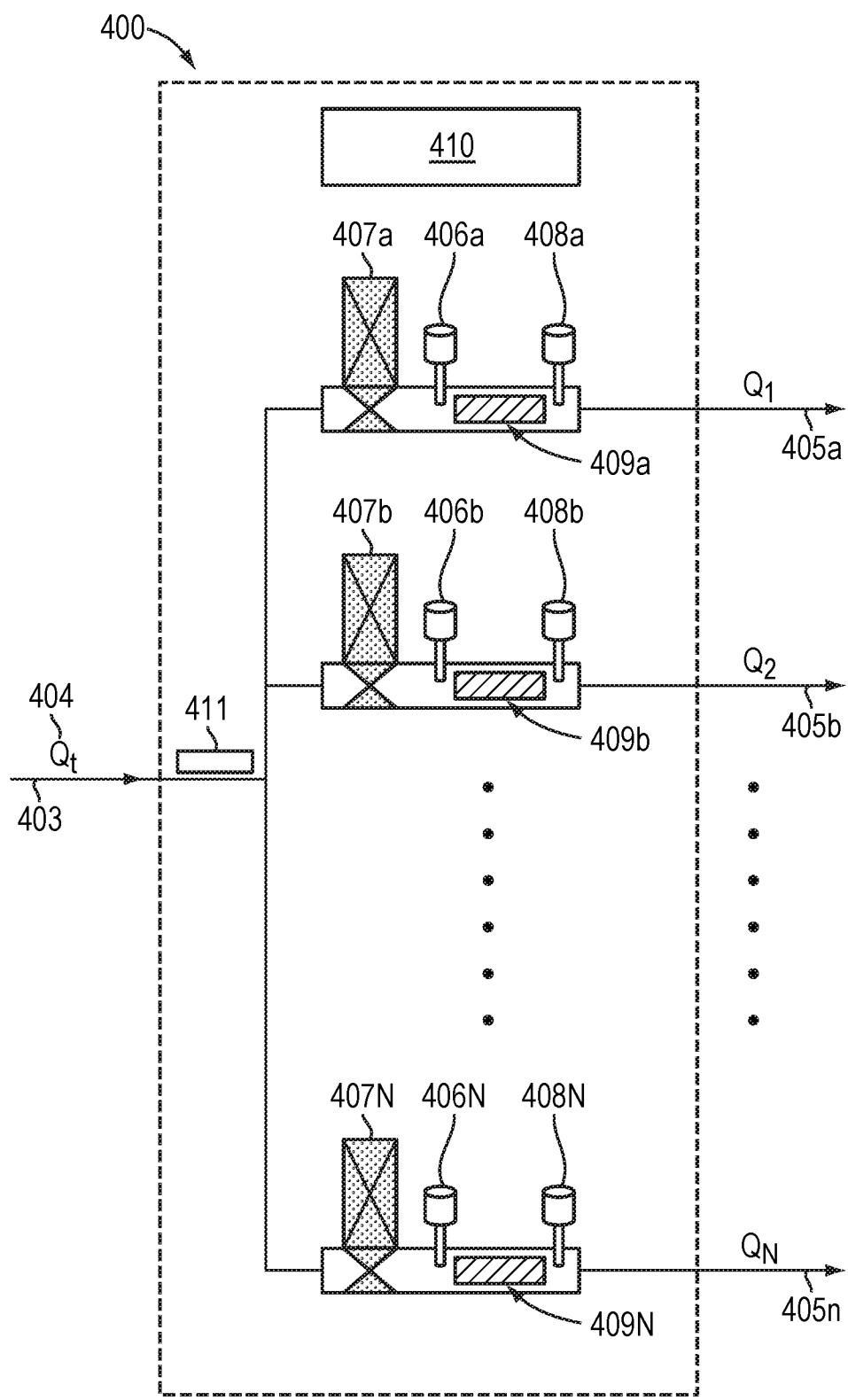
FIG. 4 is a schematic illustrating an example embodiment of a pressure based flow ratio controller.

FIG. 4 is a schematic illustrating an example embodiment of a pressure based flow ratio controller 400. The flow ratio controller 400 in FIG. 4 can be part of a multi-channel gas delivery, and selectively receives individual or mixtures of multiple gases, including for example a number of process gases and a purge gas, from gas suppliers (e.g., gas tanks). The flow ratio controller 400 is configured to receive pressure signals from pressure sensors 406, 408 to determine and precisely control the ratio of the secondary flows through each the secondary flow line 405. The flow ratio controller 400 may be configured to obtain the gas temperature signal from temperature sensor 411. Temperature sensor 411 is configured to provide a gas temperature signal representative of the temperature of the inlet flow. In alternative embodiments a temperature sensor 411 may be located on each of the secondary flow line 405 and provide a gas temperature signal representative of the temperature of the secondary flows. The provided temperature signal(s) can be used to normalize k($\in$, d, L, mw, r, $\mu$, T) and in the calibration process of flow ratio controller 400.

The flow ratio controller 400 and associated method provide the benefit of dividing a single mass flow of gas or liquid into multiple secondary flows of known, precise relative values and with a desire ratio of secondary flows without requiring a relatively high upstream pressure and without requiring knowledge of gas properties. The pressure sensors 406, 408 produce signals that are representative of the pressure measured upstream and the pressure downstream of a pressure drop element 409 respectively.

The inlet 404 is connected to secondary flow lines 405a, 405b, . . . , 405N. The inlet flow of fluid 403 is divided into secondary flows travelling at a flow rates $Q_1, Q_2, \ldots Q_N$ in the paths of secondary flow lines 405. The inlet flow rate $Q_t$, of the inlet flow within the inlet 404 is equal to the sum of the secondary flow rates $Q_1, Q_2, \ldots, Q_N$ within the secondary flow lines 405: $Q_t=\Sigma_{i=1}^{N}Q_i$. The flow ratio controller may have any number secondary flow lines 405 depending upon the needs of the system it operates within. The outlet of the secondary flow lines can be respectively connected to an equal number of locations such as processing chambers in only one process tool, or locations in two or more process tools. The outlet of the secondary flow lines can be connected to any device or destination required by the system.

Each secondary flow line 405a, 405b, . . . , 405N includes a pressure drop element 409a, 409b, . . . , 409N within its path, an upstream pressure sensor 406a, 406b, . . . , 406N located upstream of the pressure drop element 409, and a downstream pressure sensor 408a, 408b, 408N located downstream of the pressure drop element 409. The upstream pressure sensors 406 produce a signal that corresponds with the pressure upstream of the pressure drop element and can be used as the input for the variable Pui for each secondary flow line 405. The downstream pressure sensors 408 produce a signal that corresponds with the pressure downstream of the pressure drop element and can be used as the input for the variable Pdi for each secondary flow line 405. Therefore, the secondary flow rates $Q_1, Q_2, \ldots, Q_N$ within secondary flow lines 405 are linearly related to the function of pressure signals (Pui²−Pdi²) or the vector $\vec{X_i}$=[Pui², Pdi²]' as $$Qi=ki(\in i,di,Li,mw,r,\mu,T)\cdot(Pui^2-Pdi^2), \text{ or}$$

$$Qi=\vec{K_i}\cdot\vec{X_i}, i=1,2,\ldots,N$$

These linear relationships allow for the ratio among the secondary flow rates $Q_1, Q_2, \ldots, Q_N$ within the secondary flow lines 405 and the inlet flow rate, i.e.

$$r_i = \frac{Q_i}{Q_t},$$

to be determined using the signals provided by pressure sensors 406i and 408i. This is possible even with no prior information about fluid 403, the properties of fluid 403, and the absolute true flow rate $Q_t$ of fluid 403 within inlet 404. Fluid 403 may be a mixture of several component fluids and the component fluids may be known or unknown.

Controller 410 may be a computer, such as a microprocessor, with a memory and processor. Alternatively, controller 410 may be any similar device capable of performing mathematical processes. Controller 410 is programed to receive the signals provided by upstream pressure sensors 406 and downstream pressure sensors 408. Controller 410, is further programed to use the signals from upstream pressure sensors 406 and downstream pressure sensors 408 to derive transformed sensor response vectors $\vec{X_1}, \vec{X_2}, \ldots, \vec{X_N}$ for each secondary flow line 405. The transformed sensor response vectors $\vec{X_1}, \vec{X_2}, \ldots, \vec{X_N}$ have a linear relationship with the flow rate $Q_1, Q_2, \ldots, Q_N$ of the secondary flow in their secondary flow line. Controller 410 is configured to use the transformed sensor response vectors $\vec{X_1}, \vec{X_2}, \ldots, \vec{X_N}$ to determine the ratio of the secondary flow rates $Q_1, Q_2, \ldots, Q_N$ of the secondary flow lines 405. The ratio of secondary flow rates can be determined between the secondary flow rate $Q_1, Q_2, \ldots, Q_N$ of every secondary flow line 405a, 405b, . . . , 405N and the inlet flow rate $Q_t$ where $Q_t=\sum_{i=1}^{N}Q_i$.

Each secondary flow line 405 includes a valve 407 configured to control the secondary flow rate $Q_1, Q_2, \ldots, Q_N$ within the secondary flow line 405 they are located on. Valve 407 may be located upstream or downstream of pressure flow sensors 406 and 408. Controller 410 may be configured to send control signals to control valves 407 in order obtain a target or desired ratio of secondary flows. Controller 410 may be configured to determine the current ratio of secondary flow rates $Q_1, Q_2, \ldots, Q_N$ based on the pressure signals from pressure sensors 406 and 408. Controller 410 may subsequently send a control signal to at least one of the valves 407 and in response to the control signal, the at least one of the valves 407 will alter the secondary flow of its secondary flow line 405. The controller 410, by sending control signals to at least one of the valves 407, adjusts the secondary flow of at least one secondary flow line 405 until the ratio of secondary flow rates equals the desired ratio.

Controller 410 may be configured to receive a desired ratio of secondary flow rates or flow rate ratio setpoints. Controller 410 may use any of the disclosed mathematical relationships between secondary flow rates $Q_1, Q_2, \ldots, Q_N$ and signals from pressure flow sensors 406 and 408 to determine the current secondary flow rates $Q_1, Q_2, \ldots, Q_N$, the current ratio of secondary flow rates, target ratio of secondary flow rates, i.e. mass flow ratio setpoints ($r_{spi}$, i1, 2, . . . , N), the secondary flow rates $Q_1, Q_2, \ldots, Q_N$ that would produce the target ratio of secondary flow rates, and the control signals sent to least one of the valves 407 that would induce the target ratio of secondary flow rates. Controller 410 may include a feedback control module which calculates and sends control signals for each valve in the secondary flow channels based on the calculated ratio of secondary flow rates s and the desired ratio of secondary flows to regulate the flow rate ration in each of the secondary flow channels to a desired flow rate ratio setpoint. Controller 410 may also be configured to calculate the inlet flow $Q_t$.

Because the flow ratio controller 400 uses two pressure sensors 406 and 408 to measure flow rates and hence the flow rate ratios, it has several advantages over existing thermal mass flow ratio controllers. First, it provides the ability to perform pressure based mass flow ratio control utilizing the linear relationship between the secondary flow rates and the transformed signals of the pressure sensors 406 and 408. Second, pressure based flow sensors are more stable than that of prior art thermal based flow sensors. Pressure based flow sensors are also more corrosive resistant than that of thermal based flow sensors. Furthermore, pressure based flow sensors are more capable for high temperature applications than thermal based flow sensors.

In one embodiment, pressure drop elements 409 are laminar flow elements. Other pressure drop elements 409 besides laminar flow elements may be used in flow ratio controller 400 as long as there is a function equivalent to (Pu²−Pd²) comprised of the upstream pressure and/or downstream pressure that has a linear relationship to the secondary flow rate Q. One example alternative is a critical flow nozzle/orifice where the secondary flow is directly linearly related to the pressure upstream of the nozzle. However, the high pressure drop that may be induced by a critical flow nozzle may be a concern from some applications of a flow ratio controller. One benefit of using a laminar flow element as pressure drop elements 409 is that they have a low pressure drop compared to that of a critical flow nozzle/orifice.

Figures 8A, 8B:
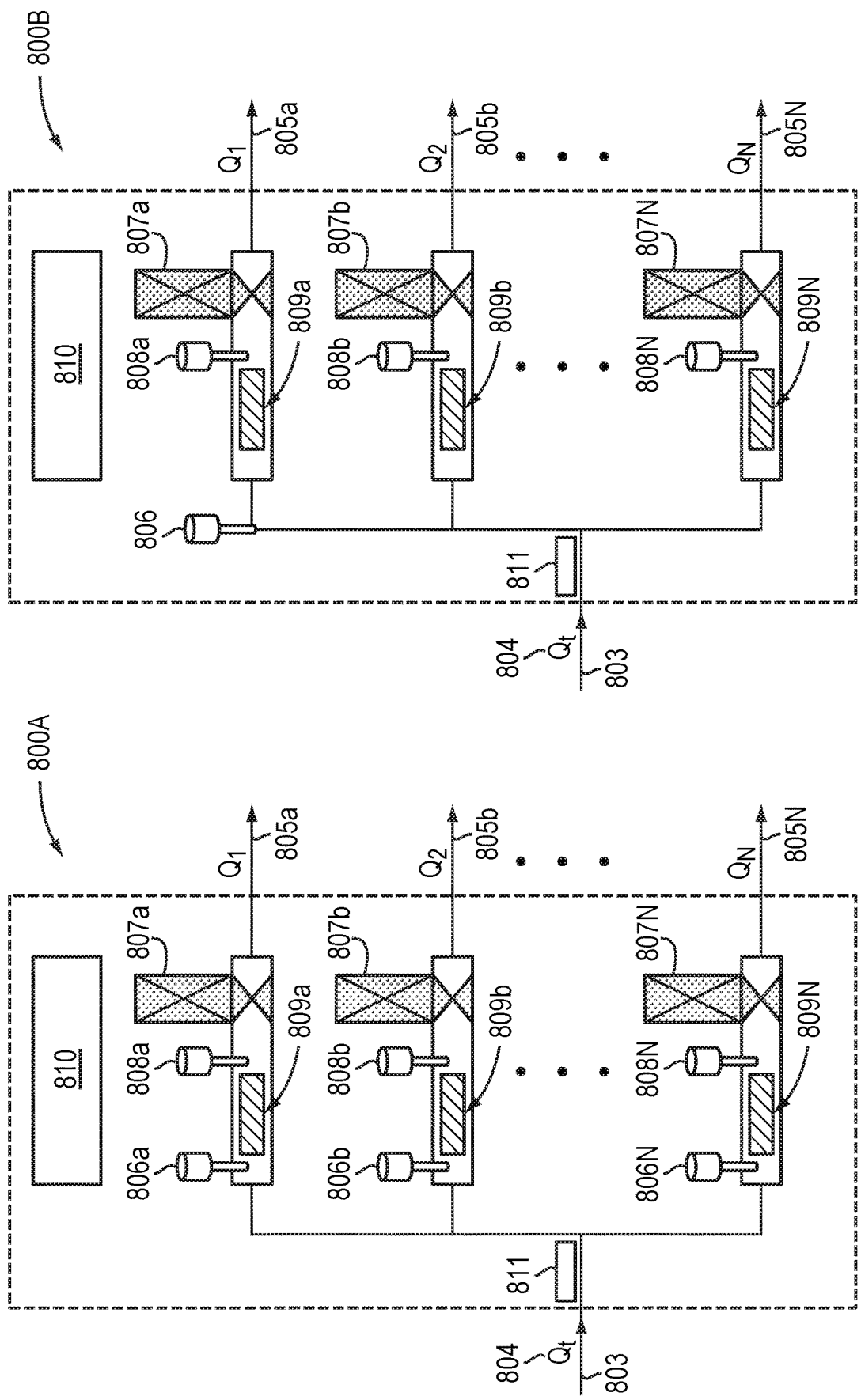
FIG. 8A is a schematic illustrating a first additional example embodiment of a pressure based flow ratio controller.
FIG. 8B is a schematic illustrating a second additional example embodiment of a pressure based flow ratio controller.

FIGS. 8A and 8B is are schematics illustrating two additional example embodiments of a pressure based flow ratio controller 800. In FIG. 8A, the flow ratio controller 800A has an upstream pressure sensor 806i, a downstream pressure sensor 808i and a pressure drop element 809i all upstream to a flow control valve 807i for each of secondary flow channel 805i (i=a, b, . . . , N). Because all upstream pressure sensors 806i are conductively connected to inlet 804, the pressure difference among the measurements can be very small. Therefore, the number of upstream pressure sensors 806i can be reduced which saves the cost of flow ratio controller 800. For example, the flow ratio controller 800B in FIG. 8B has only one upstream pressure sensor 806 which provides an upstream pressure measurement for all secondary flow channels 805i. The number of upstream pressure sensors 806 can be varied between 1 and N depending on the upstream pressure difference among these secondary flow channels 805 in the flow ratio controller 800. Both flow ratio controllers 800A and 800B can be configured to obtain the gas temperature signal from temperature sensor 811.

Figure 5:
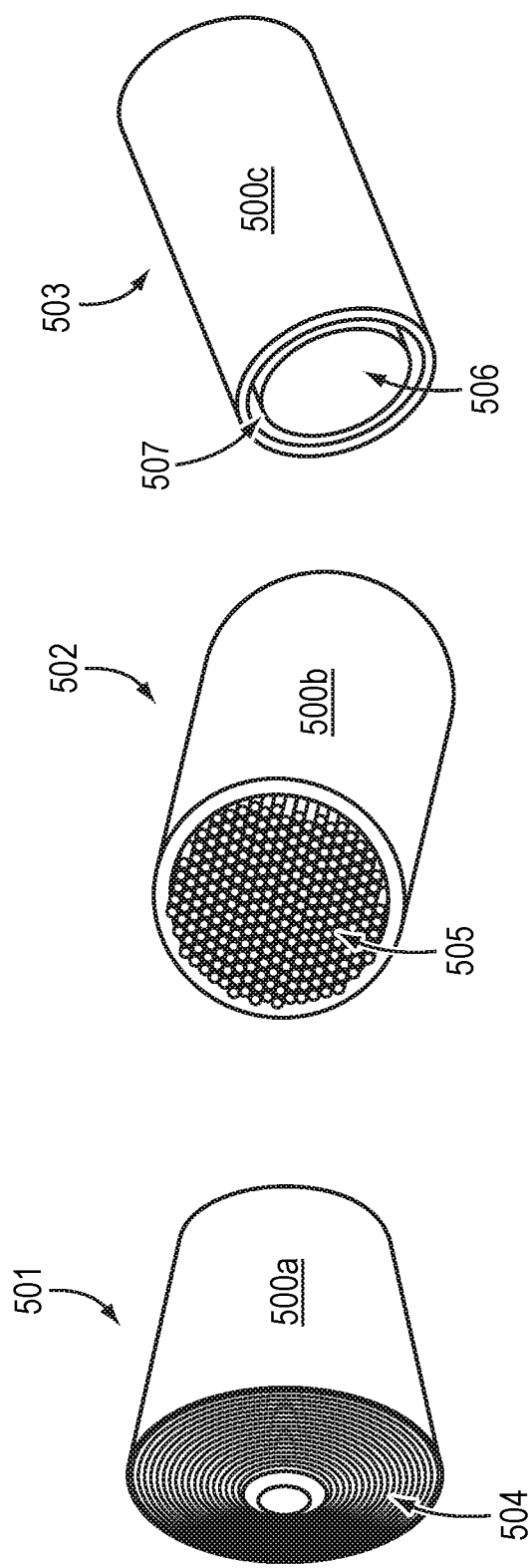
FIG. 5 is a diagram of several laminar flow elements that can be used as pressure drop elements in an example embodiment of the invention.

FIG. 5 is a diagram of several laminar flow elements that can be used as pressure drop elements in an embodiment of the invention. Several different types of laminar flow elements can be used as pressure drop elements. Potential types of laminar flow elements include a corrugated laminar flow element 501, bundle tube laminar flow element 502, and annulus laminar flow element 503. Other laminar flow elements include a parallel-plates laminar flow element and a compressed laminar flow element such as a sintered porous metal filters or other porous media. Laminar flow elements are precisely engineered with excellent consistence. Laminar flow elements also retain the relationship between flow, upstream pressure, and downstream pressure even in low pressure ranges. Each laminar flow element includes a surrounding case 500a, 500b, 500c that forces the flow to travel through the interior of the element. The interior of each laminar flow element includes obstruction(s) the induce laminar flow in the fluid traveling through the element. For the corrugated laminar flow element 501, its interior is filled with ridged and grooved layered metal plates 504. For the bundle tube laminar flow element 502, its interior is filled with tubes 505 whose lengths are parallel to the flow direction. For the annulus laminar flow element 503, its interior includes a solid cylinder 506 whose length is parallel to the flow direction that creates a ring-shaped gap 507 between the surrounding case 500c and the central cylinder 506. Any variations and constructions of laminar flow elements, including but not limited to those illustrated in FIG. 5, can be utilized by the invention so long as they are capable of inducing a laminar flow in the secondary flow lines.

Figure 6:
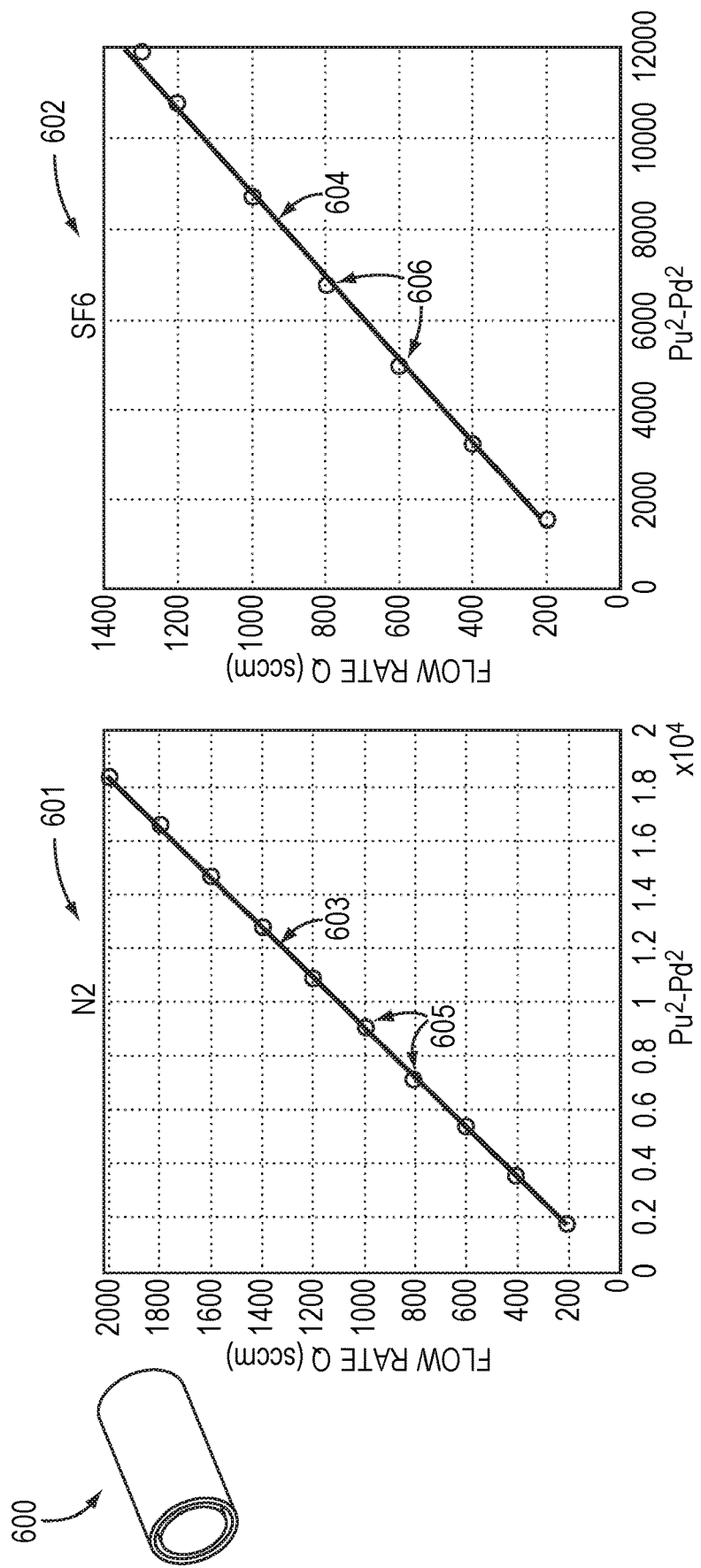
FIG. 6 is a set of graphs illustrating the relationship between a function of upstream pressure and downstream pressure and the flow in a channel with a laminar flow element for the gases N2 and SF6.

FIG. 6 is a set of graphs illustrating the relationship between a function of upstream pressure and downstream pressure and flow in a channel with a laminar flow element for the gases N2 and SF6. To gather the data that was used to create FIG. 6, an annulus laminar flow element 600 was used as a pressure drop element in a channel with pressure sensors located upstream and downstream of annulus laminar flow element 600. The flow of fluids in the channel was controlled using a mass flow controller. Graph 601 shows the relationship 603 between the flow in the channel and the function $(Pu^2-Pd^2)$ of the pressure measured upstream of annulus laminar flow element 600 (Pu) and the pressure measured downstream of annulus laminar flow element 600 (Pd) when the fluid was N2 gas. Points 605 are experimental data points used to derive relationship 603. Graph 602 shows the relationship 604 between the flow in the channel and the function $(Pu^2-Pd^2)$ of the pressure measured upstream of annulus laminar flow element 600 (Pu) and the pressure measured downstream of annulus laminar flow element 600 (Pd) when the fluid was SF6 gas. Points 606 are experimental data points used to derive relationship 604. It is clear from both graphs 601 and 602 that the function $(Pu^2-Pd^2)$ has a linear relationship with the flow in the channel. Because of this linear relationship, a flow ratio controller can use the signals that correspond to the pressure measured upstream of annulus laminar flow element 600 (Pu) and the pressure measured downstream of annulus laminar flow element 600 (Pd) to determine and control the ratio of secondary flows of an unknown fluid composed of an unknown gas or gas mixture. The strong linear relationships 603 and 604 allow for precise flow ratio measurements and control when using a pressure drop element such as annulus laminar flow element 600 in a flow ratio control as shown in FIG. 4.

In some embodiments, each secondary flow channel needs to be calibrated in order to provide a flow rate measurement for flow ratio control applications. A calibration gas such as N2 can be used to determine the coefficients of k(E, d, L, mw, r, μ, T) in the i-th secondary flow channel (i=1, 2, . . . N) for the flow calculation equation:

$$Qi=ki(\in i, di, Li, mw, r, \mu, T) \cdot (Pui^2 - Pdi), \text{ or}$$

$$Qi = \vec{K_1} \cdot \vec{X_1}, i=1, 2, \ldots, N$$

Multiple calibration points of (Pui, Pdi, Qi) can be collected for the whole operating range during the calibration process. Additionally, temperature sensors may be used to determine T for the inlet flow and/or the secondary flows. The calibration points can be used to determine the coefficients of k(∈, d, L, mw, μ, T).

An alternative flow calculation method involves constructing a 3D map of the variables Pui, Pdi, Qi as shown in FIG. 3 for each secondary flow channel during the calibration. The flow ratio controller 410,810 can use the 3D map as a look-up table to determine flow rate Qi based on the measured upstream pressure Pui and the downstream pressure Pdi for the i-the flow channel. If the inlet gas is an unknown gas, flow ratio controller 400, 800 can treat the inlet gas as a calibration gas (e.g. N2) and use either the calibrated coefficients ki(∈i, di, Li, mw, r, μ, T) or the 3D maps of (Pui, Pdi, Qi) to calculate secondary flow rates Qi as the calibration gas and then the corresponding flow ratios $r_i$. Because the flow Qi in each secondary flow line has a linear relationship with the modified pressure vector $\vec{X_1}$, the corresponding flow ratio $r_i$ is accurate even the calculated flow rate Qi is based on the calibration gas not the actual gas.

Figure 7:
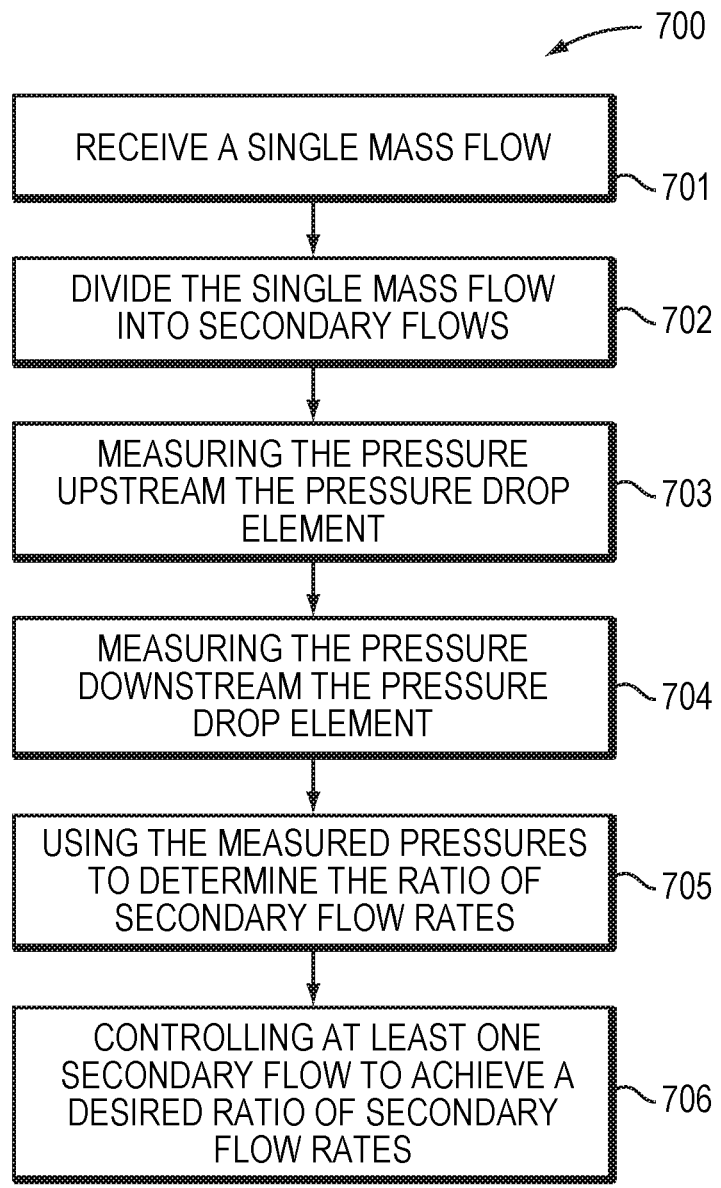
FIG. 7 is a flow chart illustrating an example embodiment of a method for dividing a single mass flow into secondary flows of desired ratio utilizing pressure sensors.

FIG. 7 is a flow chart 700 illustrating an example embodiment of a methods for splitting an inlet flow into secondary flows of desired ratios utilizing pressure sensors. The method shown in flow chart 700 can be performed using a flow ratio controller with a pressure drop element, valves, pressure sensors, controller, and other elements configured in the manner illustrated by FIG. 4 FIG. 8A, and FIG. 8B. The first step 701 is to receive an inlet flow at an inlet channel. The fluid comprising the inlet flow, fluid properties, and flow rate within the inlet may be unknown. In the next step 702, the inlet flow is divided into secondary flows. The secondary flows are carried by paths of secondary flow lines connected to the inlet. The secondary flows travel in the secondary flow lines at secondary flows rates. For each secondary flow line, the following steps 703 and 704 are performed, in step 703 a first pressure sensor will measure the pressure within the secondary flow line upstream a pressure drop element and in step 704 a second pressure sensor will measure the pressure within the secondary flow line downstream a pressure drop element.

The next step 705 is performed by a controller, the controller uses the pressure measured upstream and downstream of the pressure drop element to determine the flow rates and the ratio of secondary flow rates. This is possible because of the laminar flow element within the secondary flow lines channels, the secondary flow rates are linearly related to a function of the upstream and downstream pressure, specifically, in one embodiment, to $(Pu^2-Pd^2)$. In the final step 706, the controller calculates and sends control signals to at least one of the valves, located on the secondary flow lines to control at least one of the secondary flow rates in the secondary flow lines to obtain a specified or desired ratio of secondary flow rates. The controller may use a feedback control algorithm to complete step 706. The manner in which the control signal controls at least one of the valves is dependent upon the determined ratio of secondary flow rates and the desired ratio of secondary flow rates. The method shown in flow chart 700 may be performed continuously during the operation of a flow ratio controller and be used to achieve a sequence desired ratios of secondary flow rates with extreme accuracy.

While example embodiments have been particularly shown and described, it will be understood by those skilled in the art that various changes in form and details may be made therein without departing from the scope of the embodiments encompassed by the appended claims.

What is claimed is:

1. A system for dividing a single mass flow into secondary flows comprising:
    an inlet configured to receive an inlet flow;
    secondary flow lines connected to the inlet, each secondary flow line including:
        a flow path configured to carry a secondary flow with a secondary flow rate;
        a pressure drop element configured to create a linear relationship between the secondary flow rate and a function of a pressure upstream of the pressure drop element and a pressure downstream of the pressure drop element;
        a first pressure sensor configured to provide a first pressure signal dependent on the pressure upstream of the pressure drop element;
        a second pressure sensor configured to provide a second pressure signal dependent on the pressure downstream of the pressure drop element; and
        a valve configured to control the secondary flow rate based upon a control signal; and
    a controller configured to calculate, utilizing the linear relationship, for each secondary flow line, a ratio of the secondary flow rate to a total flow rate based upon the first pressure signal and the second pressure signal and further configured to generate the control signal to each valve to obtain a desired ratio of secondary flow to the total flow rate.

2. The system of claim 1 wherein the pressure drop element is a laminar flow element.

3. The system of claim 2 wherein the laminar flow element is one of an annulus, bundled tubes, corrugated plates, or multiple-layer plates.

4. The system of claim 1 wherein the pressure drop element is a compressed laminar flow element.

5. The system of claim 1 wherein the pressure drop element is a flow nozzle or orifice.

6. The system of claim 1 further comprising a temperature sensor configured to measure the temperature of the inlet flow.

7. The system of claim 1 wherein the valves are located in the flow path of the secondary flow lines upstream from the upstream pressure sensor.

8. The system of claim 1 wherein the valves are located in the flow path of the secondary flow lines downstream from the pressure sensors.

9. The system of claim 8 wherein a single pressure sensor is used as the first pressure sensor for all secondary flow lines.

10. The system of claim 1 wherein the function of the pressure upstream of the pressure drop element and the pressure downstream of the pressure drop element is the following:

$$f(Pu,Pd)=Pu^2-Pd^2$$

where $f(Pu, Pd)$ is the function, Pu is the pressure upstream of the pressure drop element and Pd is the pressure downstream of the pressure drop element.

11. The system of claim 1 wherein the secondary flow rates are calculated by the following:

$$Q=k*f(Pu,Pd)$$

where Q is the secondary flow rate, $f(Pu, Pd)$ is the function of the pressure upstream of the pressure drop element and the pressure downstream of the pressure drop element, and k is a function of dimensions of the pressure drop element, fluid properties, and fluid temperature.

12. The system of claim 11 wherein $k=k(\in, d, L, mw, r, \mu, T)$ where $\in$, d, and L are the dimensions of the pressure drop element, mw, r, and $\mu$ are the fluid properties, and T is the fluid temperature.

13. The system of claim 1 wherein the secondary flow rates can be determined based on a 3D map composed of calibration points having variables Pu, Pd, and Q where Q is the secondary flow rate, Pu is the pressure upstream of the pressure drop element and Pd is the pressure downstream of the pressure drop element.

14. A method for dividing a single mass flow into secondary flows of desired ratios of secondary flow rates, comprising;
    receiving an inlet flow at an inlet;
    dividing the inlet flow into secondary flow lines connected to the inlet, each secondary flow line including:
        a flow path configured to carry a secondary flow with a secondary flow rate;
        a pressure drop element configured to create a linear relationship between the secondary flow rate and a function of a pressure upstream of the pressure drop element and a pressure downstream of the pressure drop element;
        a first pressure sensor configured to provide a first pressure signal dependent on a pressure upstream of the pressure drop element;
        a second pressure sensor configured to provide a second pressure signal dependent on a pressure downstream of the pressure drop element; and
        a valve configured to control the secondary flow rate based upon a control signal;
    determining, by a controller, using the linear relationship, for each secondary flow line, a ratio of the secondary flow rate to a total flow rate based upon the first pressure signals and the second pressure signals; and
    obtaining a desired ratio of secondary flow rate to the total flow rate by generating, by the controller, the control signal to each valve.

15. The method of claim 14 wherein the pressure drop element is a laminar flow element.

16. The method of claim 15 wherein the laminar flow element is one of an annulus, bundled tubes, corrugated plates, or multiple-layer plates.

17. The method of claim 14 wherein the pressure drop element is a compressed laminar flow element.

18. The method of claim 14 further comprising measuring the of the inlet flow using a temperature sensor.

19. The method of claim 14 wherein a single pressure sensor is used as the first pressure sensor for all secondary flow lines.

20. The method of claim 14 wherein the function of the pressure upstream of the pressure drop element and the pressure downstream of the pressure drop element is the following:

$$f(Pu,Pd)=Pu^2-Pd^2$$

where $f(Pu, Pd)$ is the function, Pu is the pressure upstream of the pressure drop element, and Pd is the pressure downstream of the pressure drop element.

21. The method of claim 14 wherein the secondary flow rates are determined by the following:

$$Q=k*f(Pu,Pd)$$

where Q is the secondary flow rate, $f(Pu, Pd)$ is the function of the pressure upstream of the pressure drop element and the pressure downstream of the pressure drop element, and k is a function of dimensions of the pressure drop element, fluid properties, and fluid temperature.

22. The method of claim 21 wherein $k=k(\in, d, L, mw, r, \mu, T)$ where $\in$, d, and L are the dimensions of the pressure drop element, mw, r, and $\mu$ are the fluid properties, and T is the fluid temperature.

23. The method of claim 14 further comprising creating a 3D map composed of calibration points having variables Pu, Pd, and Q where Q is the secondary flow rate, Pu is the pressure upstream of the pressure drop element and Pd is the pressure downstream of the pressure drop element, and the controller determines the secondary flow rates based on the 3D map.

* * * * *